United States Patent [19]

Bernecker

[11] 4,086,893
[45] May 2, 1978

[54] CARBURETOR

[75] Inventor: Gunther Bernecker, Montvale, N.J.

[73] Assignee: Donald B. Conlin, Mahwah, N.J.; a part interest

[21] Appl. No.: 770,964

[22] Filed: Feb. 22, 1977

[51] Int. Cl.² .......................................... F02M 31/00
[52] U.S. Cl. ................................ 123/122 E; 123/133; 261/98
[58] Field of Search ....... 123/122 E, 122 AA, 122 H, 123/133; 261/DIG. 72, 96, 98

[56] References Cited

U.S. PATENT DOCUMENTS

| 1,000,768 | 8/1911 | Benham | 123/133 |
|---|---|---|---|
| 1,111,140 | 9/1914 | Deering | 123/133 |
| 1,318,068 | 10/1919 | Giesler | 123/122 E |
| 1,319,718 | 10/1919 | Martin | 123/122 H |
| 1,361,503 | 12/1920 | Smith | 123/122 E |
| 2,200,580 | 5/1940 | Pruss | 261/98 |
| 2,247,181 | 6/1941 | Berhouder | 123/133 |
| 2,749,223 | 6/1956 | Harrington | 123/133 |
| 2,884,917 | 5/1959 | Quinby | 123/133 |
| 3,943,221 | 3/1976 | Schladitz | 261/98 |
| 4,002,705 | 1/1977 | McKeown | 261/98 |

Primary Examiner—Ronald H. Lazarus
Attorney, Agent, or Firm—C. Bruce Hamburg

[57] ABSTRACT

A carburetor for an internal combustion engine comprises a housing, porous matter contained in the housing, means for injecting fuel into the housing and onto the porous matter to effect completion of vaporization of the fuel, means for admitting air into the housing to form a mixture with the vaporized fuel and means for conducting the mixture out of the housing for combustion in the engine.

12 Claims, 1 Drawing Figure

U.S. Patent
May 2, 1978
4,086,893
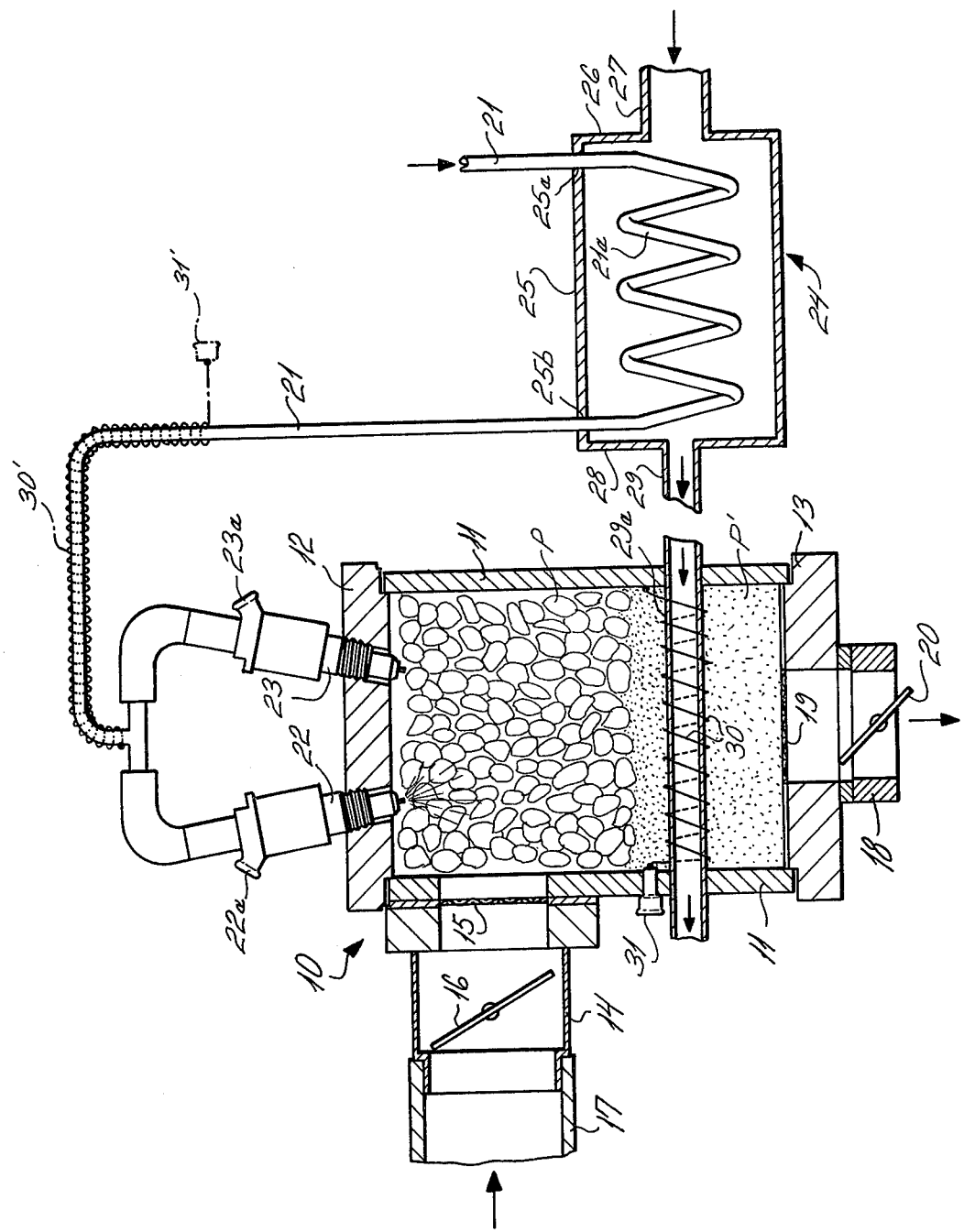

CARBURETOR

BACKGROUND OF THE INVENTION

This invention relates to a novel carburetor for an internal combustion engine.

There is a great demand for motor vehicle internal combustion engines which will consume fuel more efficiently, resulting in greater mileage (miles per gallon) and less exhaust of hydrocarbons. Moreover, engines of lower initial cost are very much wanted.

It is an object of this invention to provide an improved internal combustion engine carburetor which is very much simpler and less expensive than prior art carburetors and which results in more efficient fuel consumption with consequent greater mileage and less exhaust of hydrocarbons.

Other objects and advantages of the invention will be apparent from the following description.

SUMMARY OF THE INVENTION

According to the invention, there is provided an improved carburetor which insures sufficient heating of the fuel and the mixture of fuel and air so that the fuel will be completely vaporized before entering the intake manifold of the engine.

The carburetor of the invention comprises a housing, porous matter contained in the housing, means for injecting liquid fuel into the housing and onto the porous matter to effect completion of vaporization of the fuel, means for admitting air into the housing simultaneously with the injection of the fuel to form a mixture with the vaporized fuel and means for conducting the mixture out of the housing for combustion in the engine. The porous matter is typically a porous mineral or refractory material such as porous (unglazed) ceramic, broken up brick, cinder block or lava and the like. However, in principle, porous metallic or other porous materials, such as sintered metallic compositions, which can physically and chemically withstand the hot fuel, hot air and hot mixtures of fuel and air in the carburetor, are also suitable.

The injecting means are typically conventional injectors, which spray the fuel. However, the more complicated systems of pumps and injectors common in conventional fuel injection systems are avoided. In such conventional systems, an injector and the equipment associated therewith is provided for each of the cylinders. In the present invention, two injectors will suffice for a six or eight cylinder engine and a single injector will suffice for a four cylinder engine.

In the present invention, the fuel is preferably heated to a partially vaporized condition before being injected. To this end there may be provided a heat exchanger in which heat is transferred from the hot engine coolant to the fuel. For example, the heat exchanger may be in the form of a shell, i.e., a tank, through which the hot coolant is passed and a coil-shaped segment of the fuel line in the shell. Likewise for the purpose of helping to assure complete vaporization of the fuel, the hot coolant may also be conducted through a portion of the carburetor containing the porous matter in order to heat the porous matter. It can also be desirable to provide auxiliary electrical resistance heating means for the fuel line and/or for the carburetor to augment any heating provided by the coolant before the coolant has been fully heated by the operation of the engine. Such heating means may be thermostatically controlled to be turned off once the coolant has been fully heated.

BRIEF DESCRIPTION OF THE DRAWING

The invention will now be further described by reference to a specific embodiment as illustrated in the drawing, which is a cross section of a carburetor according to the invention.

DETAILED DESCRIPTION OF A PREFERRED EMBODIMENT

The carburetor 10 is in the form of a housing having a cylindrical side wall 11 provided with upper and lower closures 12 and 13.

Communicating with an inlet opening in the upper portion of the wall 11 is an air intake nipple 14. A screen 15 is provided across the inlet opening for filtering out particulate matter. A butterfly valve 16 is arranged in the air intake nipple 14. The distal end of the intake nipple 14 is connected to an air intake pipe 17.

Communicating with an outlet opening in the lower closure 13 is an outlet nipple 18. A screen 19 is provided across the outlet opening for retaining in the housing the hereinafter described matter while permitting the mixture of vaporized gasoline and air formed in the carburetor to discharge. A butterfly valve 20 is arranged in the outlet nipple 18. The distal end of the outlet nipple 18 communicates with the intake manifold of the engine, which is not illustrated.

The fuel line 21 communicates with a pair of conventional fuel injectors 22 and 23 which are received in respective openings in the upper closure 12. The tips of the injectors project slightly into the housing 11. The injectors 22 and 23 are connected to the electrical system of the motor vehicle (not illustrated) by means of conventional electrical connectors 22a and 23a, respectively.

The housing is substantially filled by an upper bed of small porous ceramic pieces P and a lower bed of smaller porous ceramic particles $P^1$.

An optional feature of the invention is auxiliary heating means for the fuel being fed to the injectors 22 and 23 through the fuel line 21 and for the ceramic material in the housing. A heat exchanger 24 is provided having a cylindrical shell 25 communicating with the interior of which through one end wall 26 thereof is an inlet pipe 27 and communicating with the interior of which through the opposite end wall 28 thereof is an outlet pipe 29, the outlet pipe 29 being of smaller internal diameter than the inlet pipe 27. A portion of the fuel line 21 is formed into a helical coil which is inside and substantially coaxial with the shell 25 and the inlet end of which is fed by the entering of the fuel line 21 into the shell 25 at an opening 25a in the shell 25 near the end wall 26 and the outlet end of which communicates with the portion of the fuel line 21 passing out of the shell 25 at an opening 25b in the shell 25. The inlet pipe 27 connects the shell 27 to the conventional cooling system of the motor vehicle (not illustrated) and, in particular, to the line carrying the fluid coolant, typically water or an aqueous solution of a conventional organic water freezing point depressant and boiling point elevator. For convenience, the coolant will hereinafter be referred to as "water." A portion 29a of the outlet pipe 29 passes diametrically across the interior of the housing, entering and leaving the housing through a pair of respective openings provided in the wall 11 for that purpose. An electrical heating coil 30 is helically wrapped around pipe portion 29a and is connected to an electrical connector 31 which passes through the wall 11, the connector 31 being connected to the conventional electrical system of the motor vehicle (not illustrated) whereby the coil 30 receives power from the electrical system. Alternatively, as illustrated in phantom, an electrical heating coil 30' is helically wrapped around a portion of the fuel line 21 near the injectors 22 and 23 and is connected to an electrical connector 31' which is connected to the conventional electrical system of the motor vehicle whereby the coil 30' receives power from the electrical system. The fuel line 21 is covered with thermal insulation (not illustrated) which covers the exterior of the coil 30' as well, the connector 31' of course penetrating through or being totally outside the insulation to permit the necessary connection to the electrical system of the motor vehicle.

When the ignition is switched on, fuel is pumped through the line 21 to the injectors 22 and 23 which alternately inject the fuel onto the porous ceramic pieces 24. Two injectors are usually necessary to provide an adequate fuel supply for a six or eight cylinder engine whereas one injector may be adequate for a four cylinder engine. The ceramic pieces 24, particularly due to their porosity, cause the fuel to be distributed over a large surface area, resulting in essentially complete vaporization of the fuel, particularly once the engine has warmed up. Some of the fuel may not vaporize on the ceramic pieces 24 but trickle down through the ceramic pieces 24 and onto the ceramic particles 25. These, too, are porous and, due to being smaller than the pieces 24, have an even larger specific surface area, facilitating vaporization of the fuel which theretofore had not vaporized.

Before the engine reaches its normal elevated operating temperature, typically 175°–185° F, at which vaporization of the fuel occurs more readily, supplemental heating of the carburetor to facilitate vaporization of the fuel may be desirable. Moreover, even after the engine has reached its normal elevated operating temperature, it may be desirable to provide supplemental heating of the carburetor to assure that the engine heat is effectively transferred to the ceramic pieces and particles on which the completion of vaporization of the fuel is to take place. Also to help assure complete vaporization of the fuel, means may be provided for pre-heating the fuel before it enters the carburetor. Means for effecting all of the foregoing are provided in the exemplary embodiment illustrated herein. The engine's cooling water is fed through the shell 25 of the heat exchanger 24. Because the outlet pipe 29 from the shell 25 is of smaller diameter than the inlet pipe 27 to the shell 25, it is simple to design the dimensions of the system so that at steady state, the shell 25 remains filled with circulating cooling water. Once the engine is warmed up, the cooling water will be hot and will heat the fuel flowing through the coil 21a in the shell 24. Hence, the fuel will be injected into the carburetor housing in a pre-heated, partially vaporized condition. Typically, the fuel is gasoline and the pre-heating is to a temperature of about 175° to about 185° F. Also, because the pipe portion 29a is an extension of the outlet pipe 29, hot water will flow through it, too, and help heat the ceramic material in the carburetor housing typically to a temperature of about 175° F., particularly the ceramic particles in contact with or adjacent the pipe portion 29a. The electrical heating coil 30 can be used to provide more effective supplemental heating of the ceramic material during the initial period of operation of the engine before the engine has reached its normal elevated operating temperature. In particular, the heating coil 30 may be thermostatically controlled so that it is on only when the engine is below its normal operating temperature. Alternatively, it may be preferable that the heating coil be used instead to preheat the fuel outside the carburetor, to avoid any possibility of combustion occurring in the carburetor, though the ceramic particles are generally effective to keep fuel vapors from contacting the coil in such quantities as would present a critical combustion hazard. Again the coil would preferably be thermostatically controlled so that it is on only when the engine is below its normal operating temperature. The alternative location is illustrated in phantom as heating coil 30' with its electrical connector 31', the heating coil 30' preferably being helically wrapped around a portion of the fuel line 21 closely adjacent the injectors 22 and 23 so that essentially no heat is lost by the fuel before it is injected. Typically, the thermostat for heating coil 30 or 30' is set to turn the coil off at an engine, i.e., engine coolant, temperature of 175° F.

The admission of air through the air intake pipe 17 and the air intake nipple 14 to the carburetor housing is regulated by the butterfly valve 16 in the air intake nipple 14. The screen 15 filters particulate matter out of the air before the air enters the carburetor housing. The flow of the mixture of air and vaporized fuel formed in the carburetor housing from the carburetor housing to the intake manifold of the engine is controlled by a butterfly valve 20 in the outlet nipple 18 to which the intake manifold is connected. The screen 19 prevents the ceramic material from being blown out of the carburetor housing. The butterfly valves 16 and 20 are controlled by simple throttle linkages which open the butterfly valve 20 slightly before the butterfly valve 16 in order to allow free passage of the fuel-air mixture into the intake manifold as the mixture is formed. The further the operator of the motor vehicle depresses the accelerator pedal, the more rapidly the injectors 22 and 23 operate and the further the valves 16 and 20 open whereby the rate at which the mixture of air and vaporized fuel is formed is progressively increased. Even when the valves 16 and 20 are closed, that is, when the accelerator pedal is not at all depressed, the valves 16 and 20 do not completely close off the air intake nipple 14 and the fuel-air mixture outlet nipple 18 so that the engine may be started up without necessarily depressing the accelerator pedal. In bench tests using a standard automobile engine at 1,200 r.p.m., the carburetor of the invention used as little as a third the amount of fuel consumed with the use of a standard carburetor.

What I claim is:

1. A carburetor for supplying a fuel/air mixture to an internal combustion engine having an intake manifold comprising a housing, contained in the housing only matter which is inert relative to the fuel, said matter being porous, means for injecting at least partially liquid fuel into the housing and onto said porous matter, means for heating all the fuel which is injected into the housing sufficiently before the fuel leaves the housing so that all the fuel is completely vaporized when it leaves the housing, means for admitting air into the housing simultaneously with the injection of the fuel to form a mixture with all the vaporized fuel in the housing and means for connecting the housing directly to the intake manifold of an internal combustion engine and for conducting the entire mixture out of the housing directly to the intake manifold during all phases of operation of the engine for combustion in the internal combustion engine.

2. A carburetor according to claim 1, in which the housing is of substantially uniform internal cross sectional area.

3. A carburetor according to claim 1, in which the injecting means are means for spraying the liquid fuel.

4. A carburetor according to claim 1, comprising means for heating the fuel to a partially vaporized condition before the fuel is injected.

5. A carburetor according to claim 1, comprising means for heating the porous matter.

6. A carburetor according to claim 5, in which said porous matter heating means comprises a conduit for conducting heated fluid coolant from the cooling system of an internal combustion engine across the housing.

7. A carburetor according to claim 6, comprising means for heating the fuel before the fuel is injected.

8. A carburetor according to claim 7, in which said fuel heating means comprises heat exchanger means for transferring heat from said heated fluid coolant to the fuel.

9. A carburetor according to claim 8, in which said fuel heating means additionally comprises electrical resistance heating means for heating the fuel before said fluid coolant is fully heated by an internal combustion engine.

10. A carburetor according to claim 6, in which said porous matter heating means additionally comprises electrical resistance heating means for heating the particulate matter before said fluid coolant is fully heated by an internal combustion engine.

11. A method of forming a mixture of vaporized fuel and air for combustion in an internal combustion engine having an intake manifold comprising injecting at least partially liquid fuel into a housing containing only matter which is inert relative to the fuel and onto the matter, said matter being porous, heating all the fuel sufficiently before the fuel leaves the housing so that all the fuel is completely vaporized when it leaves the housing, admitting air into the housing simultaneously with the injection of the fuel to form a mixture with the vaporized fuel in the housing and conducting the mixture out of the housing directly to the intake manifold of an internal combustion engine during all phases of operation of the engine for combustion in the internal combustion engine.

12. A method according to claim 11, in which the fuel is gasoline.

* * * * *